United States Patent
Crane et al.

(10) Patent No.: US 6,731,465 B2
(45) Date of Patent: May 4, 2004

(54) MONOCOQUE HEAD SUSPENSION

(75) Inventors: Peter Crane, St. Paul, MN (US); Zine-Eddine Boutaghou, Vadnais Heights, MN (US); Wayne Bonin, North Oaks, MN (US); Markus Mangold, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 218 days.

(21) Appl. No.: 10/041,658

(22) Filed: Oct. 24, 2001

(65) Prior Publication Data
US 2002/0109943 A1 Aug. 15, 2002

Related U.S. Application Data
(60) Provisional application No. 60/243,214, filed on Oct. 25, 2000, provisional application No. 60/243,219, filed on Oct. 25, 2000, and provisional application No. 60/304,239, filed on Jul. 10, 2001.

(51) Int. Cl.$^7$ .............................. G11B 21/16; G11B 5/48
(52) U.S. Cl. .................................. 360/244.3; 360/244.9
(58) Field of Search .......................... 360/244.2, 244.3, 360/244.9, 245.2, 264.1, 264, 260, 240

(56) References Cited

U.S. PATENT DOCUMENTS

| | | | |
|---|---|---|---|
| 4,797,763 A | 1/1989 | Levy et al. | 360/245.6 |
| 5,187,625 A | 2/1993 | Blaeser et al. | 360/244.3 |
| 5,296,983 A | 3/1994 | Blanc et al. | 360/244.3 |
| 5,570,261 A | 10/1996 | Frater et al. | 360/244.3 |
| 5,572,387 A | 11/1996 | Brooks, Jr. et al. | 360/244.3 |
| 5,731,731 A | 3/1998 | Wilcox et al. | 327/403 |
| 5,731,931 A | 3/1998 | Goss | 360/244.9 |
| 5,734,526 A | 3/1998 | Symons | 360/244.3 |
| 5,793,569 A | 8/1998 | Christianson et al. | 360/244.3 |
| 5,850,319 A | 12/1998 | Tangren | 360/244.9 |
| 5,856,896 A | 1/1999 | Berg et al. | 360/245.3 |
| 5,894,655 A | 4/1999 | Symons | 29/603.03 |
| 5,973,883 A * | 10/1999 | Yanagisawa | 360/244.9 |
| 6,014,289 A | 1/2000 | Goss | 360/244.1 |
| 6,144,530 A * | 11/2000 | Shiraishi et al. | 360/244.1 |
| 6,268,981 B1 | 7/2001 | Coon et al. | 360/244.3 |
| 6,271,995 B1 | 8/2001 | Fontana, Jr. et al. | 360/244.3 |
| 6,288,877 B1 * | 9/2001 | Khan et al. | 360/245.9 |
| 6,297,933 B1 * | 10/2001 | Khan et al. | 360/244.2 |
| 6,632,310 B2 * | 10/2003 | Freeman et al. | 156/182 |
| 6,636,388 B2 * | 10/2003 | Stefansky | 360/294.5 |
| 2002/0051319 A1 * | 5/2002 | Takagi et al. | 360/244.9 |

FOREIGN PATENT DOCUMENTS

EP 0 942 412 A1 9/1999

OTHER PUBLICATIONS

IBM, "Damped mounting plate for head gimbal assembly in hard disk drive–has cavities filled with high loss elostomer damping material, and is secured to suspension load beam with adhesive or spot welds", Jan. 10, 1999, RD 417123A, Derwent 1999 104539.*

* cited by examiner

*Primary Examiner*—Julie Anne Watko
(74) *Attorney, Agent, or Firm*—Moser, Patterson & Sheridan, LLP

(57) ABSTRACT

A monocoque head suspension carries a read-write head on a distal end and is attachable at a proximal end to an actuator assembly. The monocoque head suspension includes a bottom skin and a top skin, and also a core positioned between the bottom and top skins. The core has voids therein that form hollow regions between the bottom and top skins. The core may be made of low-density material, such as photo-imageable epoxy, polyamide or polyimide, deposited on the bottom skin, or may be a separately formed piece. The bottom skin and top skin may be made of a stainless steel material. The monocoque head suspension may be a component of an assembly to store data to a magnetic medium and read data from the medium.

57 Claims, 12 Drawing Sheets

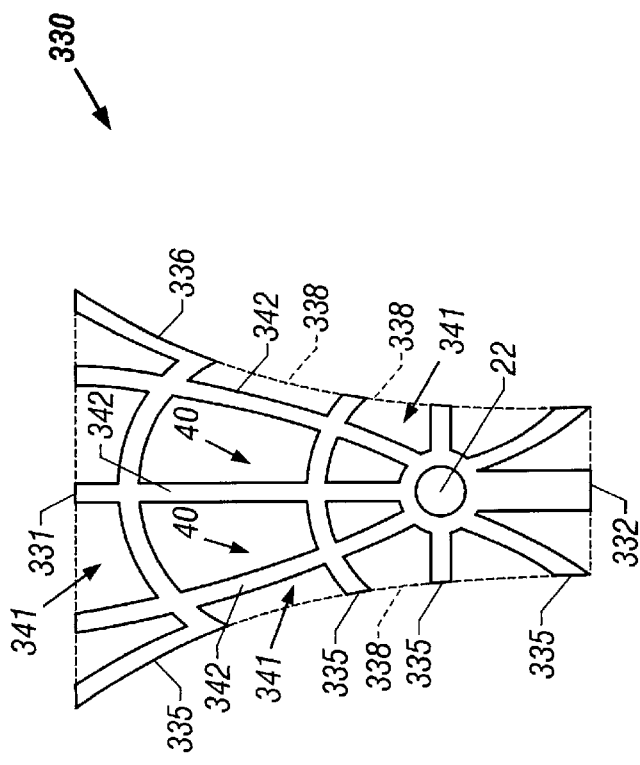
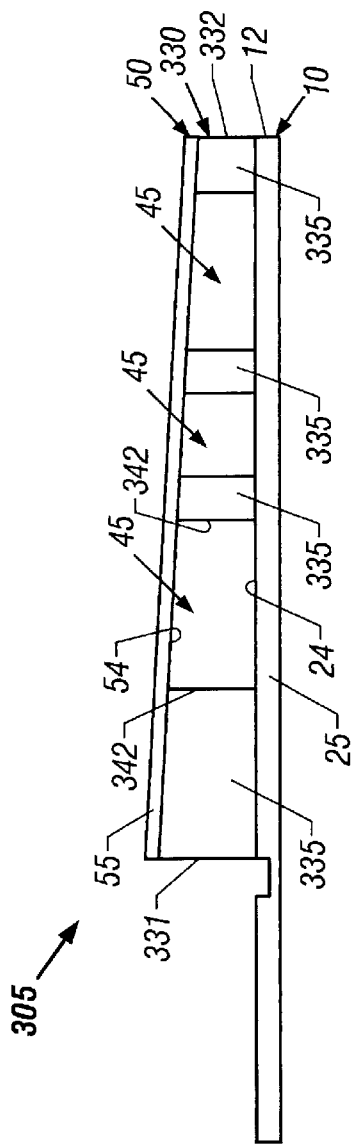

MONOCOQUE HEAD SUSPENSION

CROSS-REFERENCE TO RELATED APPLICATION(S)

This application claims the benefit of provisional application No. 60/243,214 filed on Oct. 25, 2000, entitled "Monocoque Suspension Design For Increased Stiffness and Reduced Mass Design," No. 60/243,219 filed on Oct. 25, 2000, entitled "Unibody Arm Design For High Performance Disc Drive," and No. 60/304,239 filed on Jul. 10, 2001, entitled "Monocoque Suspension With Curved Edges And Photolitographically Defined Polymer Core," which are hereby incorporated by reference as through fully set forth herein. This application is also related to U.S. patent application Ser. No. 10/042,061, filed Oct. 24, 2001, publication number U.S. 2002/0057536 A1, published on May 16, 2002, and entitled "Unibody (Monocoque) Arm Design for High Performance Disc Drives".

TECHNICAL FIELD

This invention relates to suspensions for read-write heads used, for example, in disc drives, and more particularly to monocoque suspensions for read-write heads.

BACKGROUND

Conventional disc drives use a series of rigid discs with a magnetic coating to store electronic data. The data is stored in individually magnetized bits, and the bits are located in concentric circles, known as data tracks, on the surface of the rigid discs. The discs are mounted to a motor that provides high-speed rotation, while magnetic heads read data from, and write data to, the tracks. The hydrodynamic forces of a spinning disc cause the magnetic read-write head to hover over the surface of the disc at a relatively constant distance, and an actuator assembly moves the read-write head rapidly from track to track to read and write data.

The read-write head is suspended over a disc using a head suspension, which is connected to an arm of the actuator assembly. The head suspension is exposed to inertial stresses due to the rapid movement of the read-write head, but these inertial stresses may be reduced by decreasing the mass of the suspension. Also, the head suspension must have a high stiffness to avoid "overshooting" the desired position of the read-write head over the disc, and to minimize amplitudes at resonant frequencies which are excited by the disc's air flow. In addition to the stiffness, the resonance frequencies of the head suspension, such as the sway frequency and the first-torsion frequency, may be optimized to avoid excess vibration of the read-write head. In order to increase the stiffness of a head suspension while minimizing the mass of the suspension, a monocoque suspension design may be used. A monocoque head suspension may increase the moment of inertia of the suspension while removing mass from the center of the body. Then, the majority of stresses applied to the monocoque head suspension may be transmitted on the outer surfaces, while the stiffness of the suspension is increased.

An example of a prior art monocoque head suspension is disclosed in U.S. Pat. No. 5,731,931. This monocoque head suspension includes a load beam with a rigid floor region, and includes a shell region with a ceiling region that fits in an abutting complementary relationship over the load beam's rigid floor region but where the ceiling region is separated and spaced from the floor region. The shell region has flanges along its perimeter that are attached to a top surface of the load beam using welds. The flanges and welds add mass to the suspension, which has the drawback of increasing the inertial stresses on the head suspension. Another monocoque head suspension is disclosed in related U.S. Pat. Nos. 5,734,526 and 5,894,655. This monocoque head suspension includes a load beam and a lamina, with recesses etched into either the load beam or the lamina. The load beam and lamina are affixed together with the recesses on the inside so as to form hollow chambers within the head suspension, and thus, a monocoque suspension. This monocoque head suspension has limitations that are best illustrated in comparison with the present invention, and thus, are discussed later.

SUMMARY

The invention is directed toward a monocoque head suspension that overcomes the limitations of prior art suspensions. Generally, the inventive head suspension has a core positioned between a bottom skin and a top skin. The core has voids manufactured therein, such as cavities or channels, that create hollow regions between the bottom skin and the top skin.

In one aspect, the invention provides a monocoque head suspension for carrying a read-write head on a distal end and attachable at a proximal end to an actuator assembly. The suspension has a generally planar bottom skin having an interior surface and a top skin having an interior surface opposing the interior surface of the bottom skin. A core positioned between the bottom skin and top skin, and affixed to the interior surfaces of the bottom skin and top skin, has voids that form hollow regions between the bottom skin and top skin.

In different embodiments, the voids of the core are cavities that extend through the core. The cavities form hollow regions between the bottom skin and top skin. The core may be a polymer material, such as photoimageable epoxy. The bottom skin and top skin may both be made from a metal material, such as stainless steel, and therefore, the core material may be different from the material of the bottom skin and top skin.

In one embodiment, the core is a separately manufactured core positioned between the bottom skin and top skin and affixed to the interior surfaces of the bottom skin and top skin. The core may have voids therein that form hollow regions between the bottom skin and top skin. The core may, for example, have ridges formed therein to separate the bottom skin from the top skin. These ridges in one embodiment are positioned at least along most of a perimeter of the core, and there may be further ridges positioned generally in the center of the core. Alternatively, the core material may be corrugated. The corrugated core has a plurality of channels that form hollow regions within the monocoque head suspension. These hollow regions may extend generally parallel to the interior surfaces of the bottom skin and top skin, or utilizing advanced manufacturing processes may follow the outline of the suspension structure. The core may be made of a thin sheet of metal material, or alternatively, the core may be made of a polymer material such as polyamide, polyimide or silicon. The channels may have a cross-sectional pattern in the corrugated core, for example, the pattern may be a trapezoidal pattern or sinusoidal pattern.

In a second aspect, the invention provides a method of manufacturing a monocoque head suspension for a read-write assembly used in a disc drive. The method comprises providing a generally planar bottom skin having an interior surface, forming a polymer core on the interior surface of the bottom skin, and removing selected portions of the polymer core to form cavities through the polymer core. The method further comprises affixing a top skin on the polymer core so that the cavities in the polymer core form hollow regions between the bottom skin and top skin.

In another aspect, the invention provides a method of manufacturing a plurality of monocoque head suspensions for a read-write assemblies used in disc drives. The method includes forming a sheet of multiple identical bottom skins connected together in an array, a sheet of multiple identical cores connected in an array and arranged similarly to the array of connected bottom skins, wherein each of the cores are formed with ridges, and a sheet of multiple identical top skins connected in an array and arranged similarly to the array of connected cores and connected bottom skins. While the bottom skins, cores and top skins are connected in the arrays, the sheets of bottom skins, cores and top skins are aligned. Then, one side of each core in the sheet of cores is affixed to a corresponding bottom skin in the sheet of bottom skins, and an opposite side of each core in the sheet of cores is affixed to a corresponding top skin in the sheet of top skins.

In different embodiments of this method, a UV sensitive adhesive may be use to affix the core to the top skin and to the bottom skin. In this embodiment, small holes may be formed in the top skins and in the bottom skins for exposing UV rays therethrough to activate the UV adhesive material and spot adhere the core to the top skin and to the bottom skin. The method may further include thermally curing the assembly to completely affix the core to the top skin and to the bottom skin.

In another aspect, the invention provides an assembly to store data on a magnetic medium and read data from the medium. The assembly comprises a read-write head, an actuator assembly to position the read-write head over a specified location on the medium, and a monocoque head suspension carrying the read-write head on a distal end and attached at a proximal end to the actuator assembly. The monocoque head suspension is designed as discussed previously.

Advantages of the invention include one or more of the following. Monocoque head suspensions in accordance with the invention may have greater stiffness and reduced mass. The greater stiffness helps avoid the "overshooting" problem. The greater stiffness also minimizes amplitudes at resonant frequencies, by increasing the resonant frequencies or by damping the amplitudes at the resonant frequencies. Also, manufacturing the head suspensions may be simplified because, for example, the core may be made of a photo-imageable epoxy, which only requires a lithography process to form cavities in the core and does not require an etching process and/or forming process. Further yet, the invention enables the designer to customize the resonance frequencies of the head suspension beyond the capabilities of the prior art head suspensions.

The details of one or more embodiments of the invention are set forth in the accompanying drawings and the description below. Other features, objects, and advantages of the invention will be apparent from the description and drawings, and from the claims.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is a top view of a further embodiment of a core for a monocoque head suspension in accordance with the invention.

FIG. 7 is a side view of a monocoque head suspension having the core shown in FIG. 6.

Like reference symbols in the various drawings indicate like elements.

DETAILED DESCRIPTION

Figure 1:
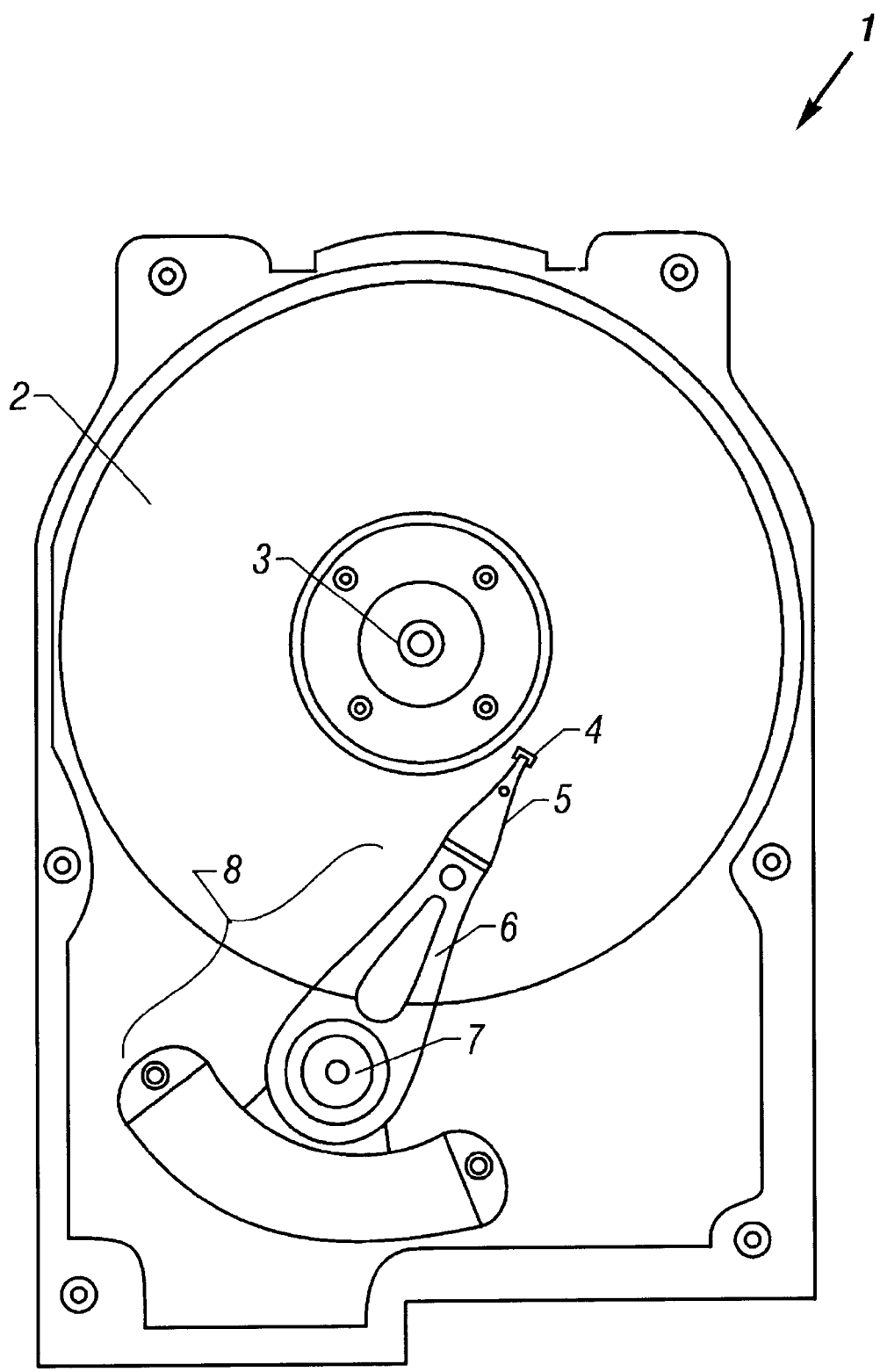
FIG. 1 is a top view of a computer disc drive having a monocoque head suspension in accordance with the invention.

A top view of a computer disc drive 1 having a monocoque head suspension 5 in accordance with the invention is shown in FIG. 1. The disc drive 1 includes a magnetic medium, such as a rigid disc 2, having a magnetic coating and mounted to a motor spindle 3. The motor spindle 3 provides high-speed rotation for the disc 2 while a read-write head 4 hovers over the disc 2. The read-write head 4 is suspended over the disc 2 by the monocoque head suspension 5, which is connected to an actuator arm 6 of an actuator assembly 8. The actuator assembly 8 also includes an actuator spindle 7, which provides a high-speed swaying motion to the actuator arm 6 and monocoque suspension 5 so as to position the read-write head 4 over the appropriate data track on the disc 2.

Figure 2:
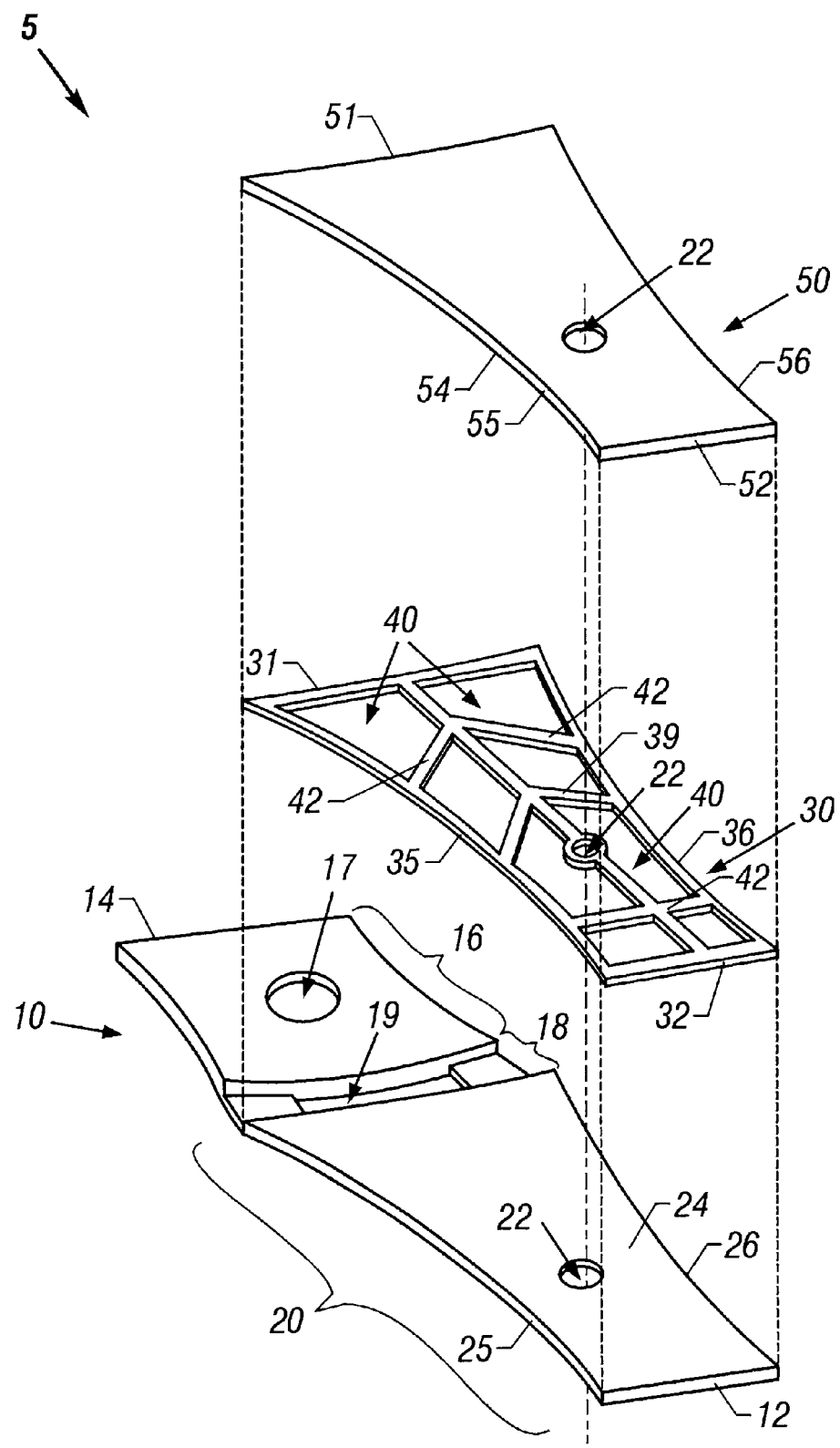
FIG. 2 is an exploded, perspective view of a monocoque head suspension in accordance with the invention.

An embodiment of a monocoque head suspension 5 shown in FIG. 1 is shown by exploded view in FIG. 2. In accordance with an aspect of the invention, the assembly of a bottom skin 10, a core 30, and a top skin 50 forms the monocoque head suspension 5. The bottom skin 10 and top skin 50 are generally planar and may be formed from thin sheets of stainless steel, and the core 30 may, in this embodiment, be made of a polymer material, such as a photoimageable epoxy. Voids formed through the core 30, such as cavities 40, create hollow regions after the completed assembly of the bottom skin 10, core 30, and top skin 50.

The bottom skin 10 has an actuator region 16 near a proximal end 14 of the bottom skin 10. The actuator region 16 is the portion of the bottom skin 10 supported by an actuator arm 6 (see FIG. 1) that provides the motion of the head suspension 5. An actuator tooling hole 17 is located in the actuator region 16 of the bottom skin 10 for mounting the head suspension 5 to the actuator arm 6. A spring region 18 of the bottom skin 10 is adjacent to the actuator region 16 in a direction toward a distal end 12 of the bottom skin 10. The spring region 18 is designed to optimize the spring rate of the head suspension 5, as is known to those skilled in the art. The spring region 16 may have a reduced thickness and a window 19 formed in the bottom skin 10 to obtain the desired spring rate.

A monocoque region 20 of the bottom skin 10 is located between the spring region 18 and the distal end 12. The monocoque region 20 is the portion of the bottom skin 10 where hollow regions (not shown and discussed later) are formed after the completed assembly of the bottom skin 10, core 30, and top skin 50. A tooling hole 22 is formed in the monocoque region 20 to align the bottom skin 10, the core 30, and the top skin 50 during the assembly. The distal end 12, the spring region 18, and a pair of longitudinal edges 25 and 26 border an interior surface 24 of the monocoque region 20. The interior surface 24 of the monocoque region 20 is coupled with a first surface 34 of the core 30. A read-write head 4 may be connected to the bottom skin 10 near the distal end 12 using a conventional gimbal attachment (not shown).

The head suspension 5 includes a dedicated core 30 that separates the bottom skin 10 and the top skin 50 and provides an increase in stiffness of the head suspension 5. In accordance with the invention, the core 30 allows the designer to customize the resonance frequencies (discussed later) of the head suspension 5 beyond the capabilities of the prior art. The core 30 has a distal end 32 that aligns with the distal end 12 of the bottom skin 10, and the longitudinal edges 35 and 36 of the core 30 also align with the longitudinal edges 25 and 26 of the bottom skin 10. The proximal end 31 of the core 30 aligns with the spring region 18 of the bottom skin 10. Cavity walls 42 separate cavities 40 formed through the core 30, and the cavity walls 42 may also surround the tooling hole 22 that aligns the bottom skin 10, the core 30, and the top skin 50.

The core 30 provides the monocoque structure of the head suspension 5 and may be made from a photo-imageable epoxy resist material (for example, such a resist is sold under the trade name SU-8 by MicroChem Corporation of Newton, Mass.). The photo-imageable epoxy may be applied in a liquid state to the interior surface 24 of the bottom skin 10, which acts as a substrate for the formation of the core. The thickness of the core 30 made of the epoxy material may be, for example, 200-$\mu$m, but may also be greater or less that this measure. Exposure to ultraviolet (UV) light and a developing temperature of about 95° C. cross-links the polymer to a hard state with a glass transition temperature of about 200° C. A photolithography process designed to cure the photo-imageable epoxy may be used to pattern the desired shape and cavity walls 42 of the core 30. Then, a solvent rinsing process leaves the cured areas of the lithographic pattern standing, such as the cavity walls 42, while the uncured areas are removed to produce the cavities 40. A post-bake at 200° C. may be applied to further harden the polymer. The shape, quantity, and arrangement of cavities 40 formed through the core 30 are determined by a lithography process, which simplifies the manufacturing process of the monocoque head suspension 5 compared to prior art suspensions that require an additional etching process.

The top skin 50 and bottom skin 10 may be made of a metal material, such as stainless steel or stainless steel Teflon (e.g., SST 302/304). The top skin 50 in combination with the monocoque region 20 of the bottom skin 10, forms the outer skin of the monocoque suspension design. An interior surface 54 of the top skin 50 is affixed to a second surface 39 of the core 30 such that the bottom skin 10 and the top skin 50 are separated by the thickness of the core 30. The top skin 50 includes a distal end 52, and longitudinal edges 55 and 56 that align with the distal end 32, and longitudinal edges 35 and 36 of the core 30. Also, the proximal end 51 of the top skin 50 may align with the proximal end 31 of the core 30. The top skin 50 also includes the tooling hole 22 that is continued through the core 30 and the bottom skin 10, so that the tooling hole 22 may be used for alignment purposes during assembly.

Figure 3:
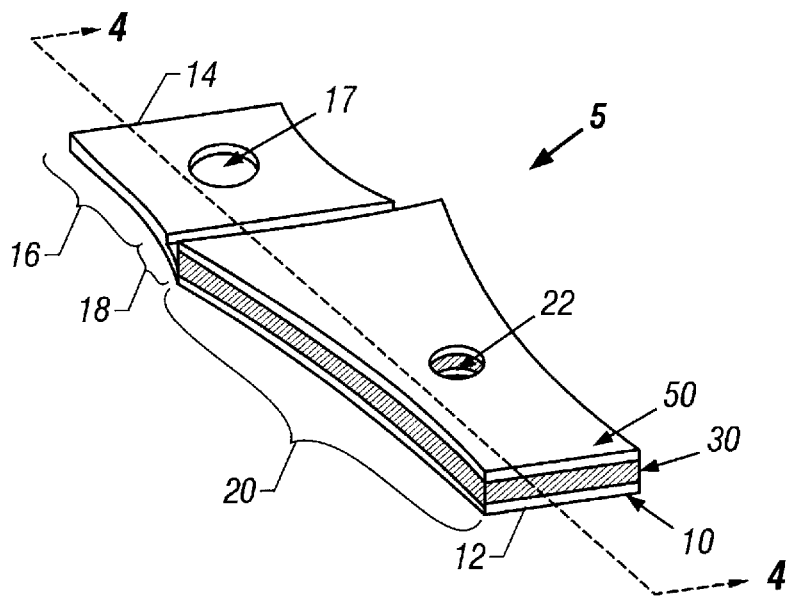
FIG. 3 is a perspective view of the monocoque head suspension shown in FIG. 2.

FIG. 3 shows a perspective view of the monocoque suspension 5 shown in FIG. 2 after final assembly. The core 30 is affixed to the interior surface 24 of the bottom skin 10, and the top skin 50 is affixed to the core 30 opposite the bottom skin 10. As previously described, the material of the core 30 may be applied to the bottom skin 10 in a liquid state, so the core 30 is self-adhered to the interior surface 24 of the bottom skin 10. After the cavities 40 in the core 30 are formed, the top skin 50 may be coupled with the core 30 using an adhesive. The core 30 and the top skin 50 are not affixed to the actuator region 16 or the spring region 18 of the bottom skin 10, and the tooling hole 22 passes through the bottom skin 10, the core 30, and the top skin 50. The monocoque region 20 of the head suspension 5 is thicker than the spring region 18 and the actuator region 16 due to the assembly of the core 30 and the top skin 50. The increased thickness of the monocoque region 20 increases the stiffness of the head suspension 5, while the cavities 40 (FIG. 2) formed through the core 30 reduce the mass of the head suspension 5. Also, the core 30 may be made of materials with lower density than the material of the bottom skin 10 and top skin 50, such a polymer material, in order to further reduce the mass of the head suspension 5.

Figure 4:
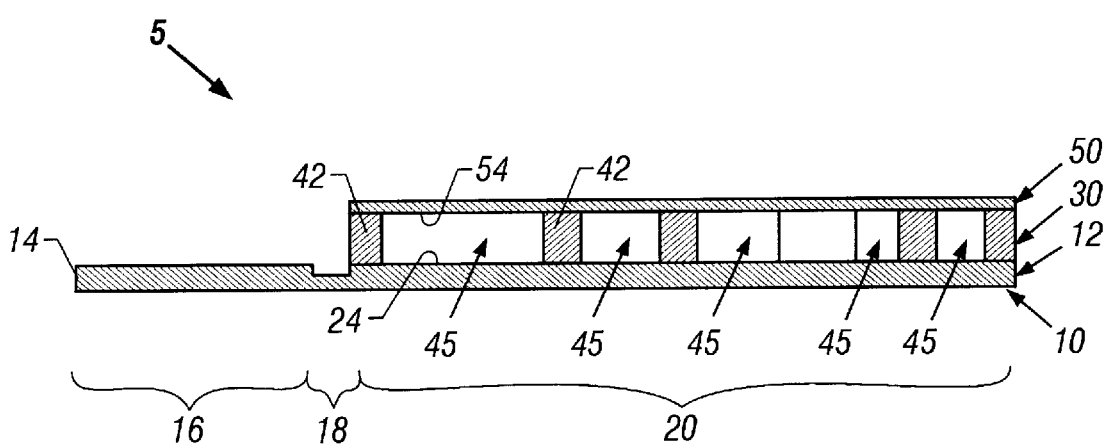
FIG. 4 is a cross-sectional view of the monocoque head suspension shown in FIG. 3.

A cross-sectional view of the read-write head suspension 5 from FIG. 3 is shown in FIG. 4. Hollow regions 45 in the monocoque region are formed when the bottom skin 10 and the top skin 50 surround the cavities 40 of the core 30. The hollow regions 45 are defined by the interior surface 24 of the bottom skin 10, the interior surface 54 of the top skin 50, and the cavity walls 42 of the core 30. The core 30 may be designed with any arrangement and size of cavities 40, cavity walls 42, and resulting hollow regions 45 to attain the desired resonance frequencies for the head suspension 5. The core 30 increases the total thickness and stiffness of the head suspension 5 while using the hollow regions 45 to reduce mass. The bulk of the bending and torsional stresses in the head suspension are carried by the outer shell of the suspension 5 (the bottom skin 10 and the top skin 50).

Figure 5A:
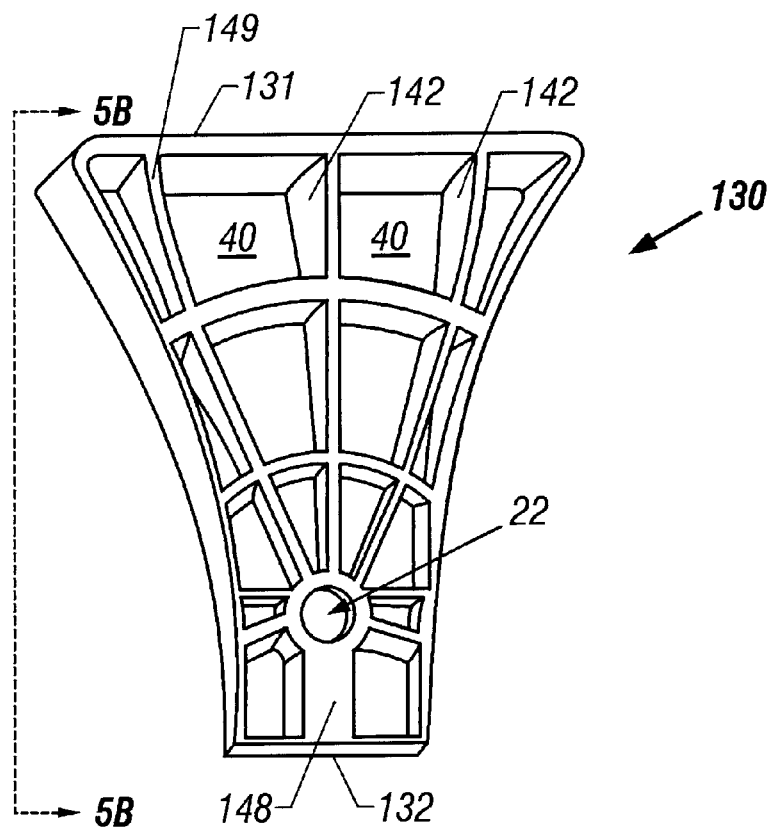
FIGS. 5A–C are a set of views for other embodiments of a core for a monocoque head suspension in accordance with the invention.
Figure 5B:
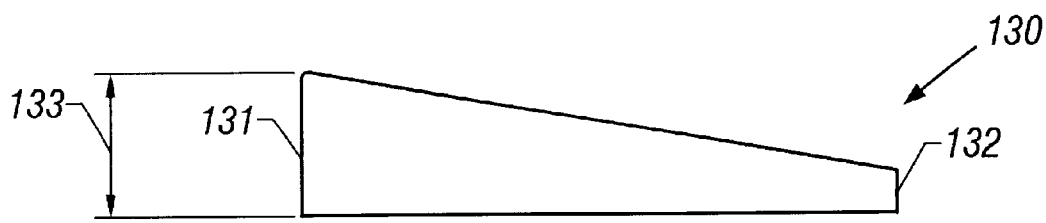
Figure 5C:
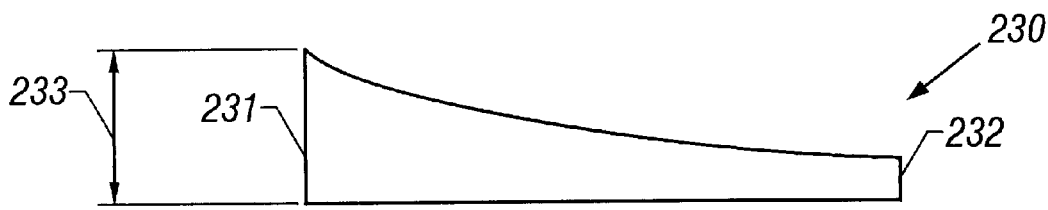

FIGS. 5A–B show another embodiment of a core 130 for the monocoque head suspension 5. This core 130 design yields different resonance frequencies of the head suspension 5 compared to the core 30 shown in FIG. 2. The lithography process used to pattern the core 130 allows the cavity walls 142 to vary in thickness and in width. FIG. 5A shows a perspective view of the core 130 for this embodiment of the invention. The cavity walls 148 near the distal end 132 of the core 130 are wider than the cavity walls 149 near the proximal end 131. This helps to further remove excess mass from areas (near the proximal end 131 in this embodiment) with lower stresses. Varying the width of the cavity walls 142 in the core 130 is another way to customize the resonance frequencies of the monocoque suspension 5. The thickness of the core 130 may be varied using a gray-scale lithography process to pattern the photo-imageable epoxy core 130, as is known to those skilled in the art. FIG. 5B shows a side view of the core 130 from FIG. 5A where the thickness 133 of the core 130 is tapered in the longitudinal direction. The core 130 has a high thickness near the proximal end 131 of the core and the thickness 133 decreases linearly to a smaller thickness near the distal end 132. For example, the thickness 133 of the core 130 may be about 200-$\mu$m at the proximal end 131 and linearly decrease to 20-$\mu$m at the distal end 132 of the core 130. However, these thickness dimensions are only examples and should not be construed as limiting. FIG. 5C shows a side view, similar to the view shown in FIG. 5B, of a further embodiment of a core 230 with varying thickness 233 in the longitudinal direction. The thickness 233 is greater near the proximal end 231, and the thickness 233 of the core 230 decreases along a curve to a smaller thickness near the distal end 232.

In other embodiments of the invention, the core may be made of a material other than the photo-imageable epoxy, such as polyamide or polyamide. The suspension designer may take advantage of the material properties associated with a polyamide or polyamide core 30, such as modulus of elasticity and material density, in order to customize the resonance frequencies of the monocoque head suspension 5. A conventional polymer etching process may be used to form the cavities 40 in a polyimide or polyamide core 30. For example, the core 30 may be affixed to the interior surface 24 of the bottom skin 10, and then the polymer etching process may be used to etch cavities 40 in the core 30 without etching away the stainless steel material of the bottom skin 10. The core 30 may be affixed to the interior surfaces 24 and 54 of the bottom skin 10 and top skin 50 to form the monocoque head suspension 5. Although the thickness of the core 30 may remain constant (as shown in FIG. 2), the thickness of the core 30 may vary from the proximal end 31 to the distal end 32 (the thickness being greater at the proximal end 31, similar to the embodiment shown in FIG. 5B. The thickness of the polyamide or polyamide core 30 separates the bottom skin 10 from the top skin 50, and the hollow regions 45 are defined by the cavity walls 42 and the interior surfaces 24 and 54 of the bottom skin 10 and top skin 50, similar to the embodiment shown in FIG. 2.

FIG. 6 shows a top view of an alternative embodiment of a core 330 dedicated to providing a monocoque structure. In this embodiment, longitudinal edges 335 and 336 of the core 330 do not extend around the entire perimeter 338. Thus, cavities 341 do not have cavity walls 342 on all sides. FIG. 7 shows a side view of a monocoque head suspension 305 having the core 330 of FIG. 6. Because some of the cavity walls 342 along the proximal end 331, the distal end 332, and the longitudinal edges 335 and 336 are removed from the core 330, the mass of the head suspension 305 is further reduced compared to previously described embodiments while maintaining a monocoque structure. The cavities 40 and open-wall cavities 341 of the core 330 form hollow regions 45 defined by the cavity walls 342 and the interior surfaces 24 and 54 of the bottom skin 10 and the top skin 50. The head suspension 305 shown in FIG. 7 shows that the thickness of the core 30 varies linearly from the proximal end 331 to the distal end 332 (similar to FIG. 5B), but this embodiment of the invention may use a core 330 with a thickness that varies along a curve (similar to FIG. 5C) or a thickness that remains constant (similar to FIG. 2).

Figure 8:
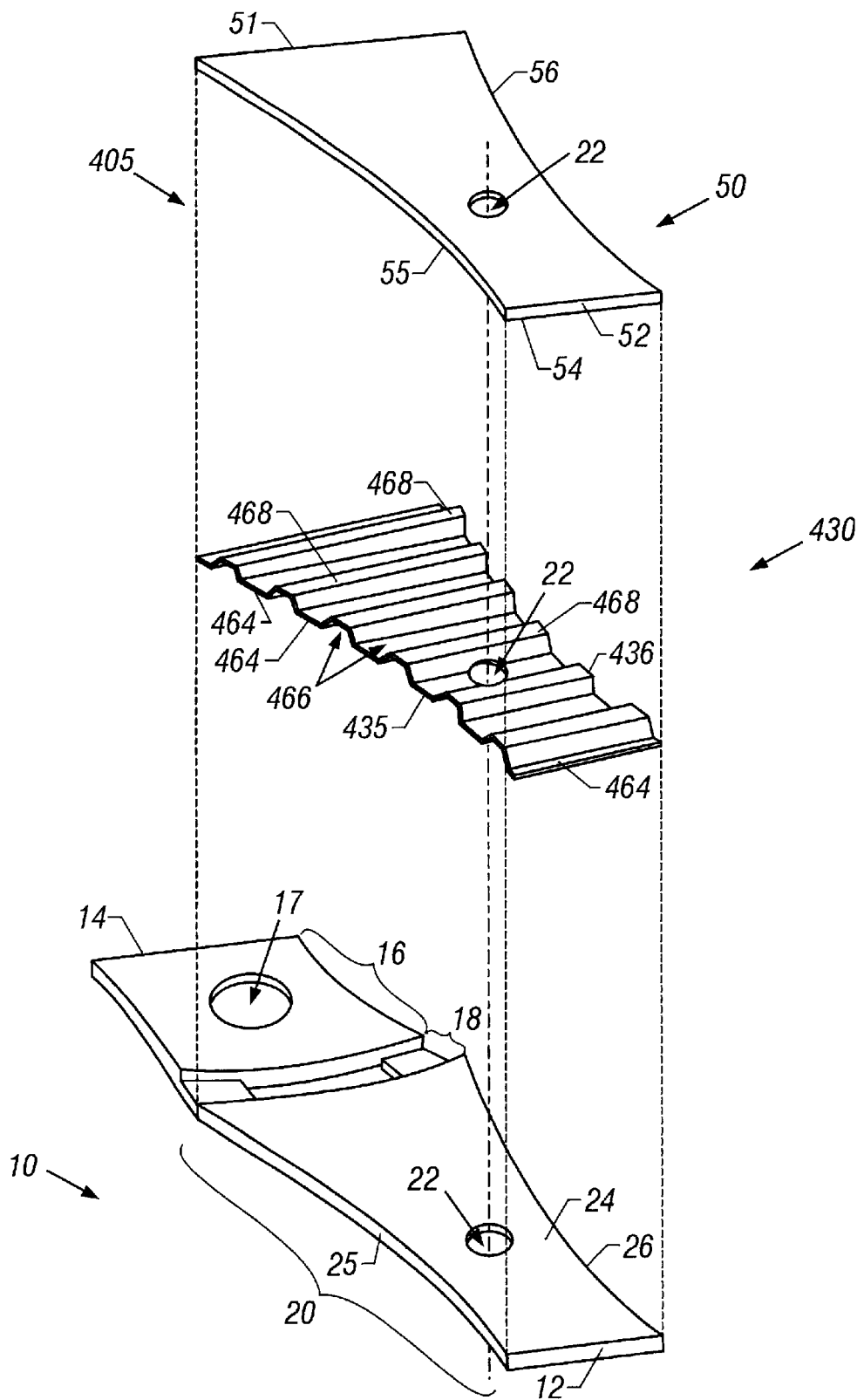
FIG. 8 is an exploded, perspective view of yet another embodiment of a monocoque head suspension in accordance with the invention.

FIG. 8 shows an exploded view of yet another embodiment of a monocoque head suspension 405. In this embodiment, the core 430 is a separately formed piece of corrugated material, which forms channels 466, instead of forming cavities as in FIGS. 2–7. The channels 466 are voids formed in the core in order to create the hollow regions 45 (not shown and discussed later) in the monocoque head suspension 405 after the completed assembly of the bottom skin 10, core 430, and top skin 50. The corrugated core 430 may use a trapezoidal cross-sectional pattern to form channels 466. The channels 466 may run in a direction that is perpendicular to an axis of the head suspension 405 that extends longitudinally and parallel to a line that extends through the proximal end 14 and distal end 12 of the bottom skin 10, or in other words, from one side edge 435 of the core 430 to an opposite side edge 436 of the core 430. The channels 466 in the core 430 separate the bottom skin 10 from the top skin 50. In one example, the depth of the channels 466 may be about 200-$\mu$m, although the channel depth may be deeper or more shallow in other embodiments. The trapezoidal pattern of the corrugated core 460 provides a pattern of alternating first surfaces 464 and second surfaces 468.

Figure 9:
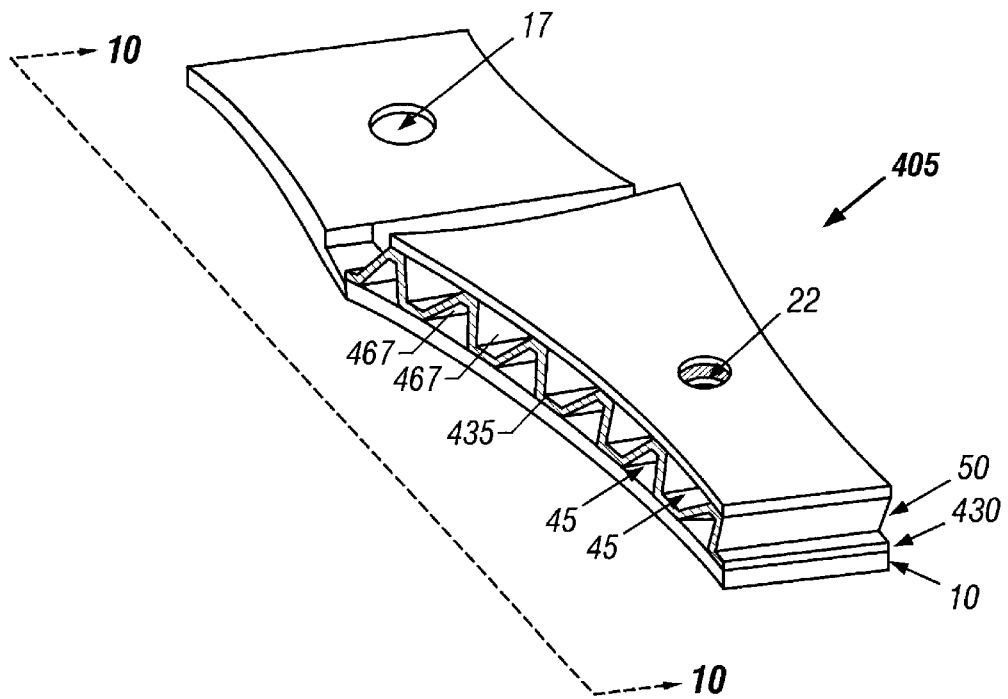
FIG. 9 is a perspective view of the monocoque head suspension shown in FIG. 8.
Figure 10:
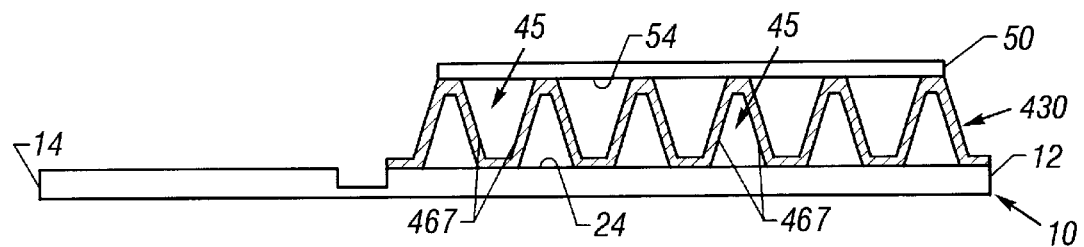
FIG. 10 is a side view of the monocoque head suspension shown in FIGS. 8 and 9, taken from the perspective indicated in FIG. 9.

In this embodiment of the invention, the first surfaces 464 are affixed to the interior surface 24 of the bottom skin 10 while the second surfaces 468 are affixed to the interior surface 54 of the top skin 50. A perspective view of the assembled monocoque suspension 405 for this embodiment is shown in FIG. 9, and FIG. 10 shows a side view. The channel walls 467 of the corrugated core 430 and either the interior surface 24 of the bottom skin 10 or the interior surface 54 of the top skin 50 define the hollow regions 45 of the monocoque head suspension 405. The material of the corrugated core 430 may be a thin sheet of metal or polymer such that the channels 466 are formed using a stamping process or an etching process. The thickness of the core 430, the material of the corrugated core 430, the depth of the channels 466, and the angles of the trapezoidal pattern are all parameters that may be used by the designer to customize the resonance frequencies of the head suspension 405.

Figure 11:
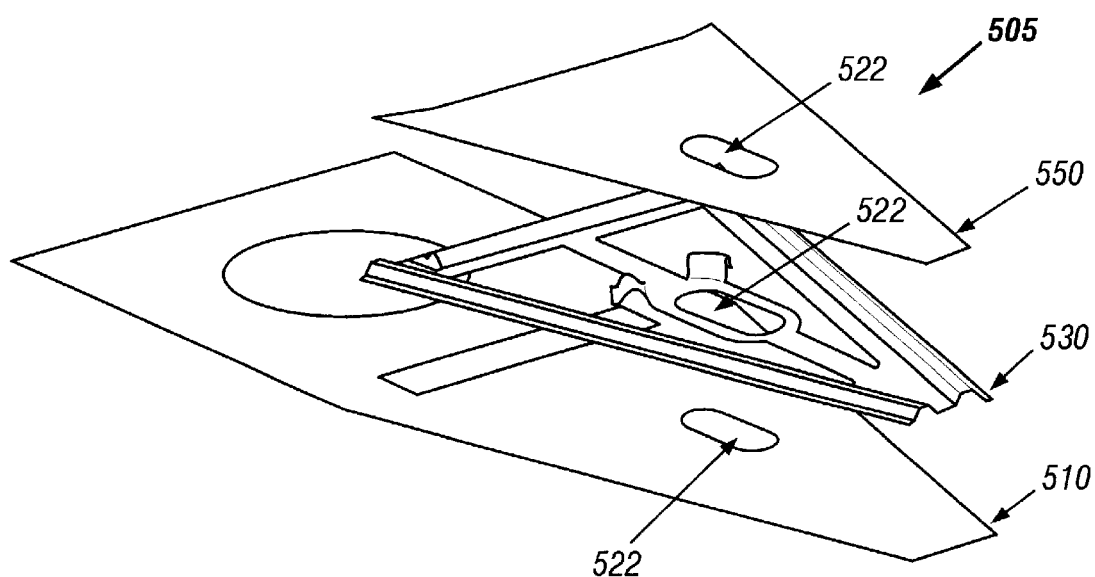
FIG. 11 is an exploded, perspective view of a further embodiment of a monocoque head suspension in accordance with the invention.

In another embodiment of the invention, shown by exploded view in FIG. 11, a monocoque head suspension 505 has a formed core 530 that is positioned between a bottom same basic outline (in the horizontal plane) as the outline of the top skin 550 and bottom skin 510 between which the core 530 is positioned. In this embodiment, the general outline of the core 530 in the horizontal plane is generally triangular, with the base of the triangle at a proximal end 532 of the core 530. The core 530 is comprised of three outside beams 534, 536 and 538 whose ends are connected together and form the perimeter of the core 530. Hereafter, beam 534 is referred to as the base beam (because it is the base of the triangle), and beams 536 and 538 are referred to as side beams. The core 530 also may have a fourth beam 540, which is referred to as the center beam, and which attaches to the center of the base beam 534 and extends distally and attaches to the meeting ends of the two side beams 536 and 538. The center beam 540 in a central portion of its length has a tooling hole 522 extending perpendicularly and vertically therethrough. At the region of the center beam 540, the center beam is ring-shaped, wherein the tooling hole 522 extends through the ring 541 formed in beam 540. As shown in FIG. 11, the top skin 550 and the bottom skin 510 have a similar tooling hole 522 formed in them. As discussed earlier, the tooling holes 522 assist in lining up the three pieces of the suspension head 505 during assembly.

Figure 12:
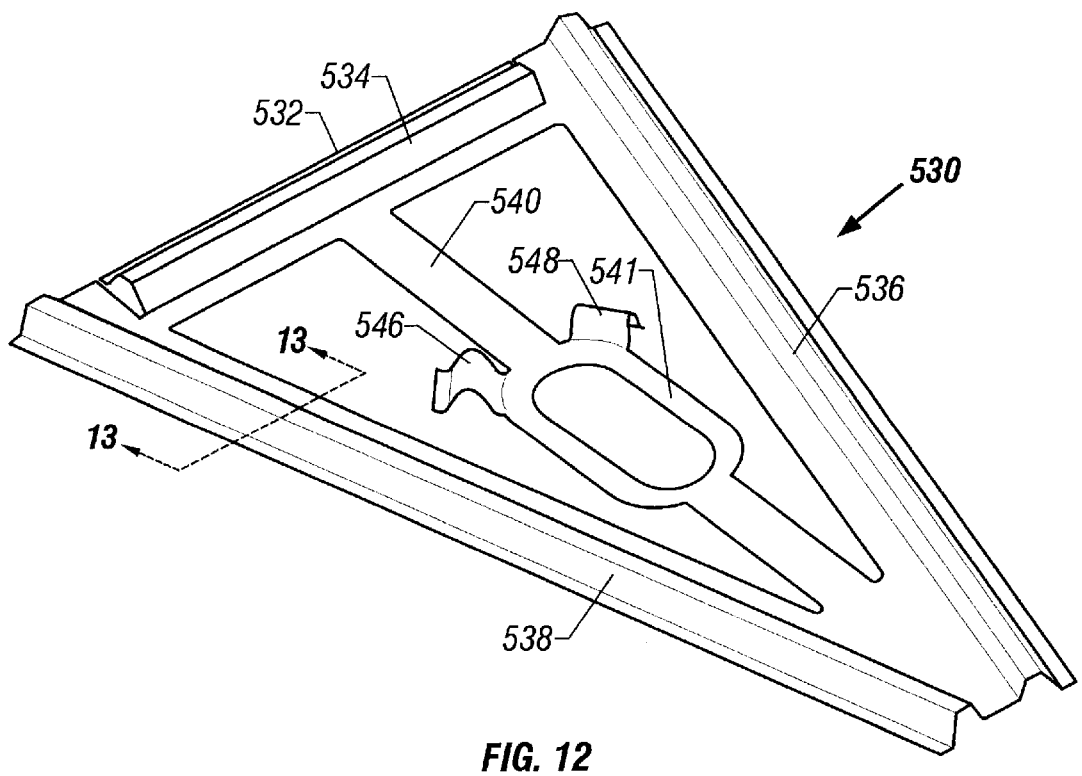
FIG. 12 is a perspective view of the core of the monocoque head suspension shown in FIG. 11.
Figure 13:
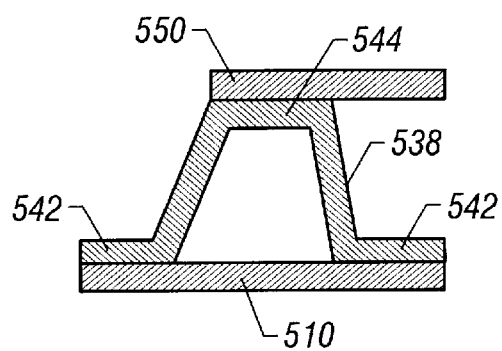
FIG. 13 is a cross-sectional diagram of a ridge formed in the core shown in FIG. 12, the cross-section being indicated in FIG. 12.

Ridge-like shapes are formed in the outside beams 534, 536 and 538 of the core 530. In the embodiment shown in FIG. 12, the outside beams 534, 536 and 538 each have a ridge laterally extending along their respective lengths. A cross-section of one of these ridges—specifically the ridge for beam 538—is shown in FIG. 13. As shown in FIG. 13, ridges have bottom flanges 542 that attach to the bottom skin 510 and also have a top portion 544 that attaches to the top skin 550. The ridges prevent the top skin 550 and the bottom skin 510 from adjoining one another upon assembly, and thus provide for the monocoque design of the head suspension 505. The center beam 540, while not having such a ridge extending along its length in this embodiment, does have two small ridge structures 546 and 548 attached to the center beam 540 at the center ring 541. As with ridges formed in outside beams 534, 536 and 538, ridges formed in ridge structures 546 and 548 have bottom flanges 542 that attach to the bottom skin 510 and also have a top portion 544 that attaches to the top skin 550. The two ridge members 546 and 548 positioned generally in a central region of the monocoque region of the head suspension 505 provides internal support structure between the top skin 550 and the bottom skin 510. Possible materials for the core 530 are a soft stainless steel Teflon (SST) or aluminum sheet metal.

Figure 14:
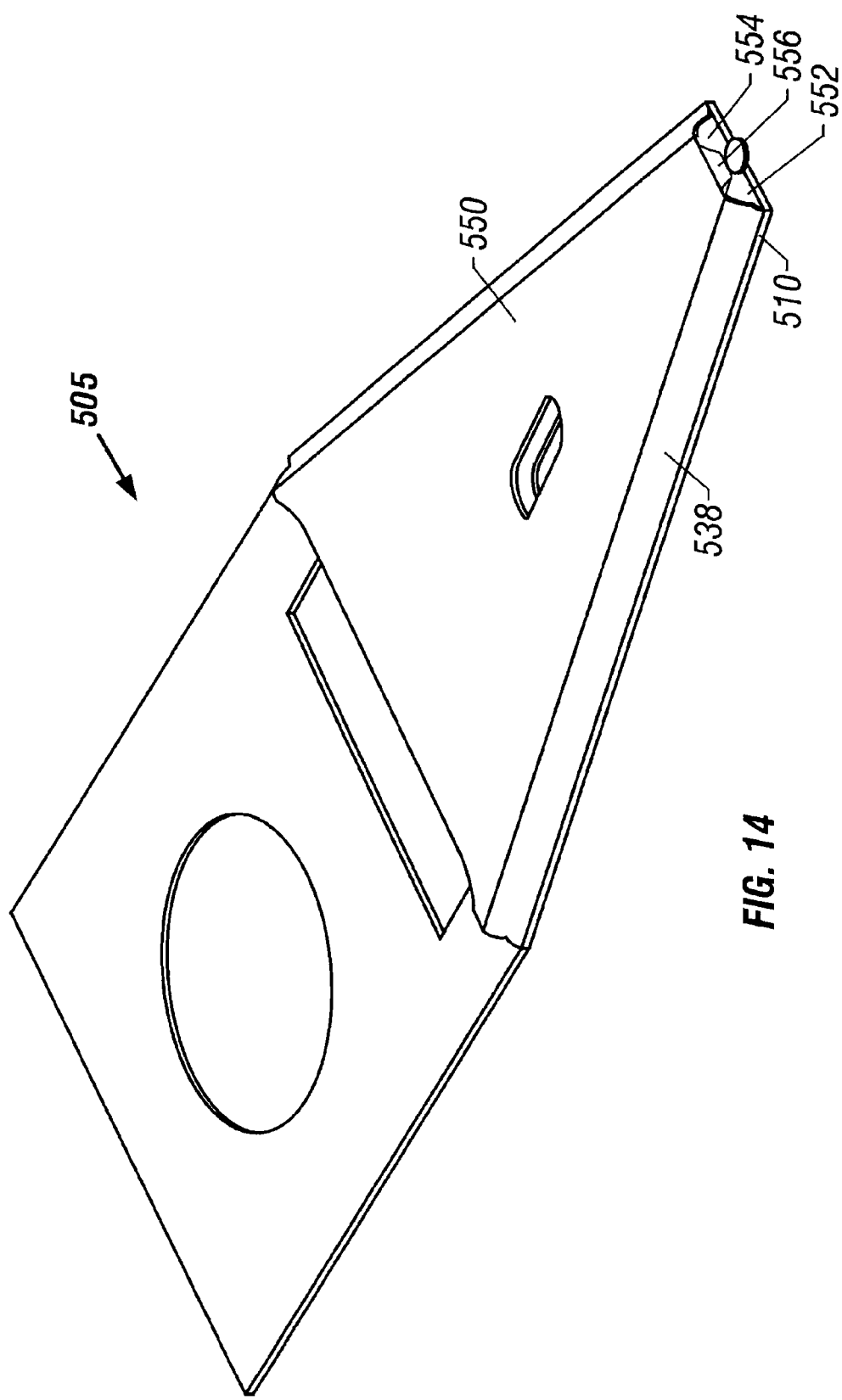
FIG. 14 is a perspective view of the monocoque head suspension of FIG. 11 shown after assembly.

In FIG. 14, the suspension head 540 is shown after final assembly, and has a box-like design. The top skin 550 is attached to the top portion 544 of the ridges formed in outside beams 534, 536 and 538 and the ridge members 546 and 548 (not shown in FIG. 14), and thus the top skin 550 rests on top of the top portion 544 of these ridges. FIG. 14 also illustrates voids formed in the monocoque assembly—namely, voids formed by channels 552 and 554 of ridges formed in the outside beams 536 and 538, and voids formed in a central region 556 between the ridges of the outside beams 534, 536 and 538.

Figure 15:
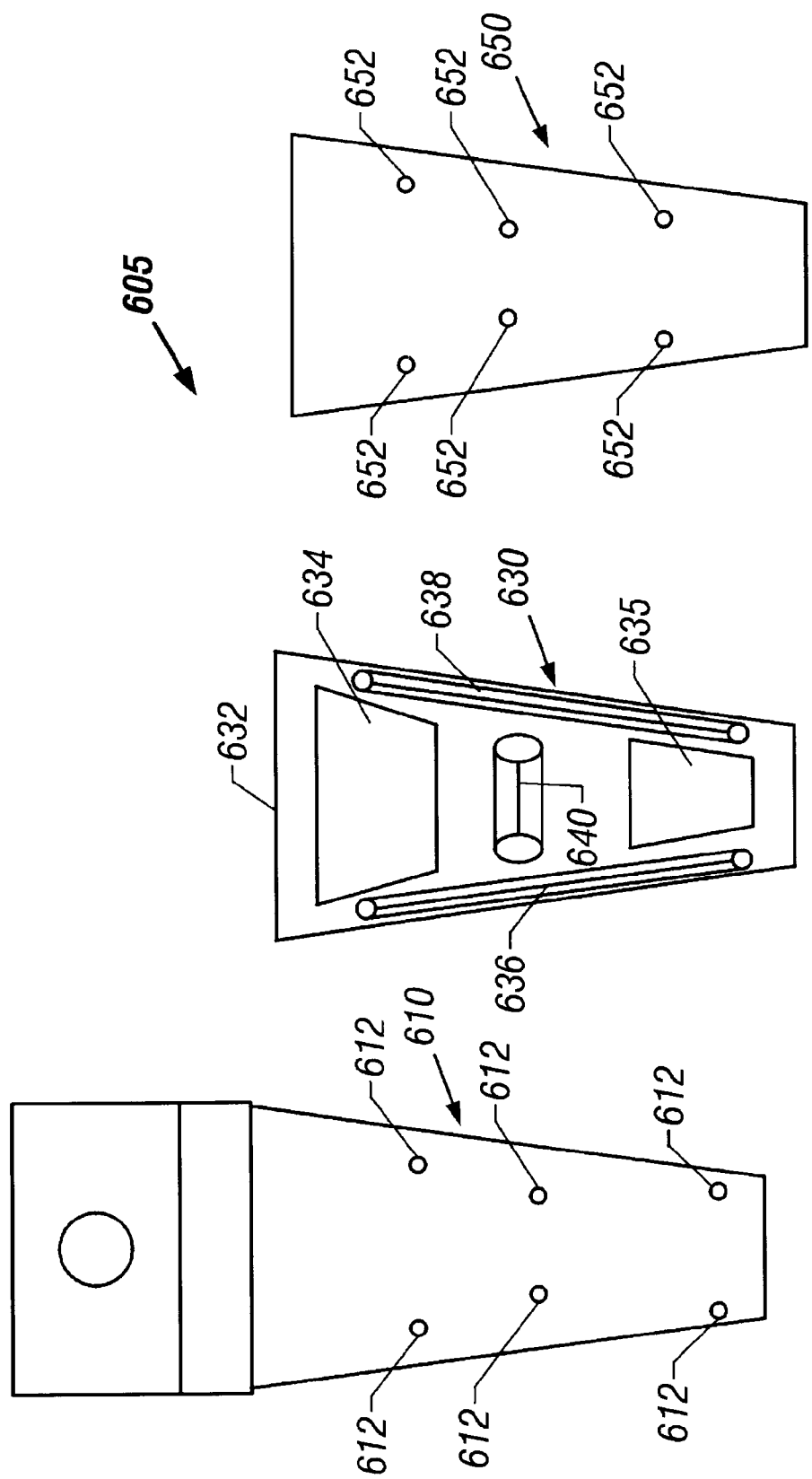
FIG. 15 are top plan views of a bottom skin, core, and top skin that make up a further embodiment of a monocoque head suspension in accordance with the invention.

FIG. 15 shows a variation of the formed-core embodiment of the invention. FIG. 15 shows top plan views of a bottom skin 610, formed core 630 and top skin 650 that make up head suspension 605. As with the embodiment shown in FIGS. 11–14, the formed core 630 shown in FIG. 15 has the same basic outline (in the horizontal plane) as the outline of the top skin 650 and bottom skin 610 between which the core 630 is positioned during final assembly. The general outline of the core 630 is triangular, with the base of the triangle at a proximal end 632 of the core 630. The core 630 comprises a sheet of material (for example, SST or aluminum) with spaces cut out in two regions 634 and 635. The two regions 634 and 635 that are cut out of the core 630 may, as in this embodiment, make up about half of the area of the core 630.

Formed in the core 630 on opposite sides of the core 630 are two ridges 636 and 638, which may have a cross-section such as previously described and shown in FIG. 13. The ridges 636 and 638 extend laterally across nearly the entire length of their respective sides of the core 630. The ridges 636 and 638 extend upward from a top surface of the core 630 and have top portions (as with the ridge shown in FIG. 13) upon which the top skin 650 rests and is permanently affixed during assembly. The core 630 also has a center ridge 640 formed generally in the center of the core 650. This ridge 640 extends laterally for a shorter distance than the outside ridges 636 and 638 extend, and in this embodiment is wider than the outside ridges 636 and 638. Although wider than ridges 636 and 638, ridge 640 does not extend upward any higher than ridges 636 and 638, but extends upward the same distance at ridges 636 and 638. As such, the top skin 650, which in one embodiment is substantially planar, may rest stably upon all three ridges 636, 638 and 640, and is permanently affixed to all three ridges 636, 638 and 640.

At both lateral ends of all three ridges 636, 638 and 640, holes may be created by the upward formation of the ridges, as shown in FIG. 15. Also, the bottom skin 610 and the top skin 650 also have small holes formed therein. The bottom skin 610 has six such holes, all labeled 612 in FIG. 15, and the top skin 650 likewise has six such holes, all labeled 652 in FIG. 15. The purpose served by these holes 612 and 652 is to allow UV exposure to enter the holes during assembly, as will be explained in more detail later.

It will be appreciated that various configurations formed in the core material are possible to yield the desired stiffness of the monocoque head suspension. Also, the box-like configuration shown in the embodiments of FIGS. 11–15, for example, may be achieved by features in the core other than ridges, or dimples. For example, the core may have raised lines formed in them, cylinders, etc., all with the same goal of providing boundary conditions that would reduce motion of the top and bottom skins, and thus increase the overall stiffness of the system.

Figure 16A:
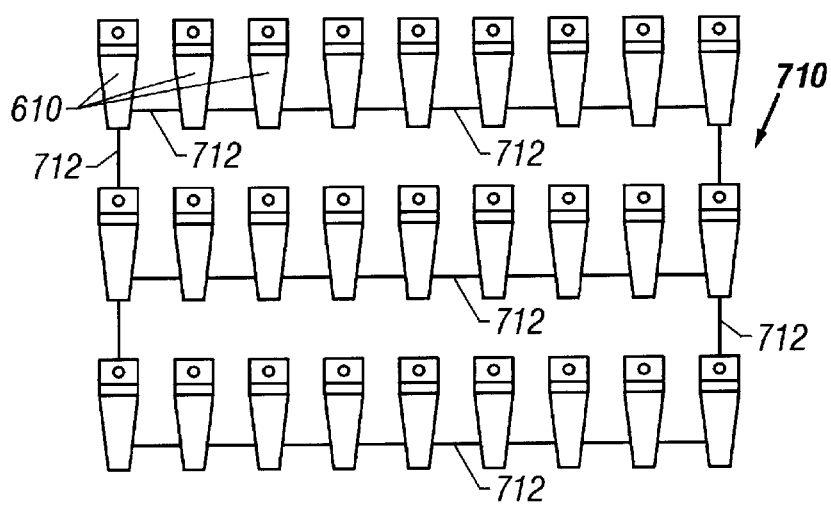
FIG. 16 are top plan views of sheets of bottom skins, cores and top skins shown in FIG. 15.
Figure 16B:
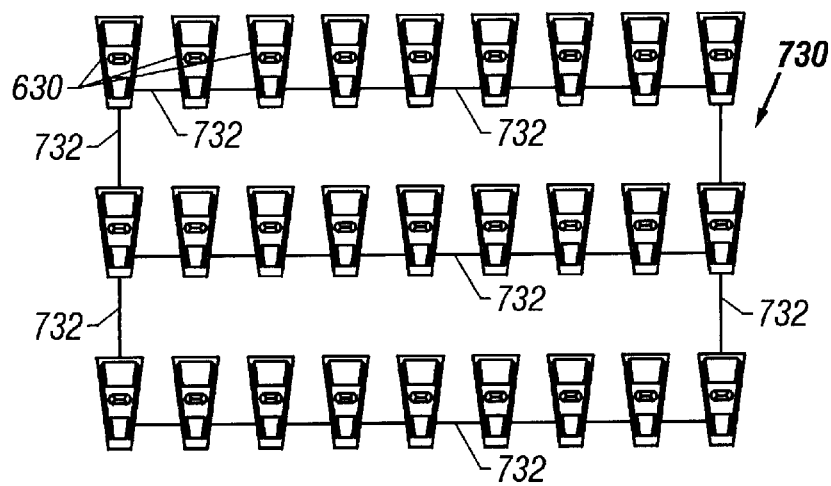
Figure 16C:
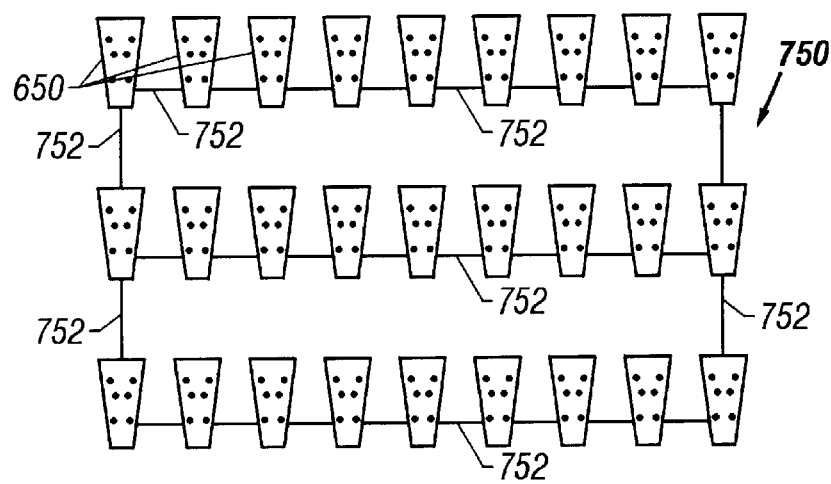

A method of efficient mass manufacturing of a monocoque head suspension, such as the head suspension 605 shown in FIG. 15, may include the following steps. The first step is to form sheets of multiple bottom skins 610, cores 630 and top skins 650. These sheets may be formed using a stamping technique or any other comparable method. FIGS. 16A–C shows the sheets as formed. As shown in FIG. 16, sheet 710 contains 27 bottom skins 610. The 27 bottom skins 610 are formed in an array of three rows and nine columns of bottom skins 610. Connectors 712 between each of the bottom skins 610 hold skins 610 in place in the array. Next, a similar sheet 730 includes an array of 27 similarly positioned cores 630. The cores 630 are similarly connected together and held in place by connectors 732. Lastly, a similar sheet 750 includes an array of 27 similarly positioned top skins 650. The top skins 650 are similarly connected together and held in place by connectors 752.

The next step in the manufacturing method is to dispose an adhesive on the top of ridges 636, 638 and 640 formed in the cores 630, and in appropriate areas on a top surface of the bottom skins 610. This is done while the cores 630 and bottom skins 610 are still connected together in sheets 730 and 710. Next, the top skins 650 and bottom skins 610 are aligned to sandwich the cores 630 between them. This again is done while the skins 610 and 650 and cores 630 are still connected together in sheets 710, 750 and 730, respectively. The next step, in the case where a UV sensitive adhesive is used, is to spot-adhere the assemblies using a UV source that is directed both through holes 612 in the bottom skins 610 and through the holes 652 in the top skins (see FIG. 15). Then, a thermal cure is performed to adhere the head suspensions completely. At this point the finally assembled 27 suspension heads may be detached from their connectors 712, 732 and 752 (see FIGS. 16A–C) and used in a computer disc drive on the type shown in FIG. 1. Embodiments of a monocoque head suspension in accordance with the invention may have greater stiffness and reduced mass compared to the prior art. The cavity walls that surround hollow regions in prior art monocoque suspensions have been made of the same material as the bottom skin, such as stainless steel. By using a core material with lower density than stainless steel the monocoque head suspension in accordance with the invention may have increased thickness and stiffness with reduced mass compared to the prior art. Also, the core may be made of a photo-imageable epoxy, which only requires a lithography process to form cavities. As such, the manufacturing process for monocoque head suspensions does not require an etching process to form the cavities, unlike the prior art.

Embodiments in accordance with the invention also offer suspension designers the ability to customize the resonance frequencies with a greater range of design parameters. For example, the varying thickness of cores from proximal to distal ends along a linear or polynomial curve is a parameter that the designer may exploit to customize the resonance frequencies. Additionally, other parameters, such as varying the width of the cavity walls, the material of the core, and the size, quantity, and arrangement of cavities may be used with conventional finite element analysis techniques to customize the resonance frequencies of a monocoque head suspension. Also, the invention allows the longitudinal edges of the bottom skin, along with the aligning longitudinal edges of the core and the top skin, to be curved, and adjusting the curve of the longitudinal edges is another parameter for the suspension designer to utilize when customizing the resonance frequencies of the head suspension.

A number of embodiments of the invention have been described. Nevertheless, it will be understood that various modifications may be made without departing from the spirit and scope of the invention. For example, cores may be made of a material other than photo-imageable epoxy, polyamide or polyamide, such as silicon or a low-density metal material. In a further embodiment, a core may be coupled with interior surfaces, for example, surfaces 24 and 54 of the bottom skin 10 and the top skin 50 shown in FIG. 2, using a method other than an adhesive, such as a welding process. Also, the embodiment shown in FIGS. 8–10 disclosing the corrugated core 430 may have channels 466 of a pattern other than a trapezoidal pattern, for example, a sinusoidal pattern. Accordingly, other embodiments are within the scope of the following claims.

What is claimed is:

1. A monocoque head suspension for carrying a read-write head on a distal end and attachable at a proximal end to an actuator assembly, the suspension comprising:
   a generally planar bottom skin having an interior surface;
   a top skin having an interior surface opposing the interior surface of the bottom skin; and
   positioned between the bottom skin and top skin and affixed to the interior surfaces of the bottom skin and top skin, the core having voids formed therein that form hollow regions between the bottom skin and top skin, wherein the top and bottom skins are separated by the thickness of the core.

2. The monocoque head suspension of claim 1, wherein the voids are cavities formed through the core such that the hollow regions are defined by at least the interior surfaces of the bottom skin and top skin.

3. The monocoque head suspension of claim 2, wherein the core comprises a polymer material.

4. The monocoque head suspension of claim 3, wherein the bottom skin and top skin comprise a metal material.

5. The monocoque head suspension of claim 3, wherein the polymer material comprises a photo-imageable epoxy material.

6. The monocoque head suspension of claim 3, wherein the polymer comprises polyimide or polyamide.

7. The monocoque head suspension of claim 3, wherein the polymer material comprises silicon.

8. The monocoque head suspension of claim 2, wherein the cavities are formed through the core using a lithography process.

9. The monocoque head suspension of claim 2, wherein the thickness of the core varies from a proximal end to a distal end of the core.

10. The monocoque head suspension of claim 9, wherein the thickness of the core varies linearly from the proximal end to the distal end of the core.

11. The monocoque head suspension of claim 9, wherein the thickness of the core varies along a curve from the proximal end to the distal end of the core.

12. The monocoque head suspension of claim 1, wherein the core is separately manufactured and affixed to both the top skin and the bottom skin.

13. The monocoque head suspension of claim 12, wherein the core has ridges formed therein to separate the bottom skin from the top skin.

14. The monocoque head suspension of claim 13, wherein the ridges are positioned at least along most of a perimeter of the core.

15. The monocoque head suspension of claim 14, wherein further ridges are positioned generally in the center of the core.

16. The monocoque head suspension of claim 12, wherein the core is a corrugated material such that the voids are channels formed in the corrugated material.

17. The monocoque head suspension of claim 16, wherein the corrugated material comprises a thin sheet of metal.

18. The monocoque head suspension of claim 16, wherein the corrugated material comprises a polymer.

19. The monocoque head suspension of claim 16, wherein the corrugated material has a trapezoidal cross-section pattern.

20. The monocoque head suspension of claim 16, wherein the corrugated material has sinusoidal cross-sectional pattern.

21. The monocoque head suspension of claim 1, wherein the bottom skin and top skin have longitudinal edges that are curved.

22. The monocoque head suspension of claim 1, wherein the core further comprises:
   a plurality of walls extending between the bottom skin and top skin and affixed to the interior surfaces of the bottom skin and top skin.

23. The monocoque head suspension of claim 22, wherein at least one wall of the core laterally provides a lateral boundary between two of the hollow regions.

24. The monocoque head suspension of claim 22, wherein the at least one wall of the core laterally provides a lateral boundary between two of the hollow regions.

25. The monocoque head suspension of claim 22, wherein the walls of the core laterally bound at least two of the hollow regions.

26. The monocoque head suspension of claim 22, wherein each hollow region is circumscribed by the walls of the core.

27. An assembly to store data on a magnetic medium and read data from the mediums the assembly comprising:
   a read-write head;
   an actuator assembly to position the read-write head over a specified location on the medium; and
   a monocoque head suspension carrying the read-write head on a distal end and attached at a proximal end to the actuator assembly, the suspension comprising:
   a generally planar bottom skin having an interior surface;
   a top skin having an interior surface opposing the interior surface of the bottom skin; and a core positioned between the bottom skin and top skin and affixed to the interior surfaces of the bottom skin and too skin, the core having voids therein that form hollow regions between the bottom skin and top skin, wherein the voids are cavities formed through the core such that the hollow regions are defined by at least the interior surfaces of the bottom skin and top skin.

28. The monocoque head suspension of claim 27, wherein the core comprises a polymer material, and wherein the bottom skin and top skin each comprise a stainless steel material.

29. The monocoque head suspension of claim 28, wherein the cavities are formed through the core using a lithography process.

30. The monocoque head suspension of claim 28, wherein the thickness of the core varies from the proximal end to the distal end of the core.

31. The monocoque head suspension of claim 27, wherein the core is separately manufactured and affixed to both the top skin and the bottom skin.

32. The monocoque head suspension of claim 31, wherein the core has ridges formed therein to separate the bottom skin from the top skin.

33. The monocoque head suspension of claim 32, wherein the ridges are positioned at least along most of a perimeter of the core.

34. The monocoque head suspension of claim 33, wherein further ridges are positioned generally in the center of the core.

35. The monocoque head suspension of claim 31, wherein the corn is a corrugated material such that the voids are channels formed in the corrugated material.

36. A monocoque head suspension for carrying a read-write head on a distal end and attachable at a proximal end to an actuator assembly, the suspension comprising:
 a generally planar bottom skin having an interior surface;
 a top skin having an interior surface opposing the interior surface of the bottom skin; and
 a polymer care having a first surface affixed to the interior surface of the bottom skin and a second surface affixed to the interior surface of the top skin such that the core separates the interior surfaces of the bottom skin and the top skin, the core having cavities formed therethrough that form hollow regions between the bottom skin and top skin.

37. The monocoque head suspension of claim 36, wherein the core comprises a photo-imageable epoxy material.

38. The monocoque head suspension of claim 37, wherein the cavities are formed through the core using a lithography process.

39. The monocoque head suspension of claim 38, wherein the thickness of the core varies from a proximal end to a distal end of the core.

40. A monocoque head suspension for carrying a read-write head on a distal end and attachable at the proximal end to an actuator assembly, the suspension comprising:
 a generally planar bottom skin having an interior surface;
 a top skin having an interior surface opposing the interior surface of the load beam; and
 a separately manufactured one-piece core positioned between the bottom skin and top skin and affixed the interior surfaces of the bottom skin and top skin, the core having voids formed therein that form hollow regions between the bottom skin and top skin.

41. The monocoque head suspension of claim 40, wherein the core has ridges formed therein to separate the bottom skin from the top skin.

42. The monocoque head suspension of claim 41, wherein the ridges are positioned at least along most of a perimeter of the core.

43. The monocoque head suspension of claim 42, wherein further ridges are positioned generally in the center of the core.

44. The monocoque head suspension of claim 40, wherein the core is a corrugated material such that the voids are channels formed in the corrugated material.

45. A monocoque head suspension for carrying a read-write head on a distal end and attachable at a proximal end to an actuator assembly, the suspension comprising:
 a generally planar bottom skin having an interior surface;
 a top skin having an interior surface opposing the interior surface of the bottom skin; and
 a corrugated core positioned between the bottom skin and top skin and affixed to the interior surfaces of the bottom skin and top skin, the corrugated core having a plurality of channels therein that form hollow regions within the head suspension, the hollow regions extending generally parallel to the interior surfaces of the bottom skin and top skin.

46. The monocoque head suspension of claim 45, wherein the corrugated core comprises a thin sheet of metal material.

47. The monocoque head suspension of claim 46, wherein the corrugated core has a trapezoidal cross-sectional pattern.

48. Read-write head suspension, comprising:
 a pair of spaced metal skins; and
 core means for connecting the skins.

49. The read-write suspension of claim 48, wherein the spaced metal skins comprise steel and the core means comprise a material having a low-density relative to steel.

50. The read-write suspension of claim 48, wherein the spaced metal skins comprise steel and wherein the core means comprises a polymer, aluminum, or silicon.

51. The read-write head suspension of claim 48 wherein the core means comprises mass reduction features.

52. The read-write head suspension of claim 48 wherein the core means is adhesively connected to the spaced skins.

53. The read-write head suspension of claim 48 wherein the core means is adhesively connected to the spaced skins by means of a ultraviolet light, curable adhesive.

54. The read-write head suspension of claim 53 wherein the spaced skins have a plurality of holes for admitting ultraviolet light.

55. A monocoque head suspension for carrying a read-write head on a distal end and attachable at a proximal end to an actuator assembly, the suspension comprising:
 a generally planar bottom skin having an actuator region separated from a monocoque region by a spring region, the monocoque region having an interior end proximate to the spring region and extending a distal end;
 a top skin extending from the interior end of the monocoque region to the distal end; and
 a core affixed to the top skin and monocoque region of the bottom skin.

56. The monocoque head suspension of claim 55, wherein the core further comprises:
 at least one void formed therein defining a hollow region between the top skin and spring region of the beam.

57. The monocoque head suspension of claim 55, wherein the core further comprises at least three lateral contact regions, the first and third lateral contact regions coupled to the top skin region, and the second lateral contact region coupled to the spring region of the beam between the first and second contact regions.

* * * * *

UNITED STATES PATENT AND TRADEMARK OFFICE
CERTIFICATE OF CORRECTION

PATENT NO. : 6,731,465 B2
DATED : May 4, 2004
INVENTOR(S) : Peter Crane et al.

It is certified that error appears in the above-identified patent and that said Letters Patent is hereby corrected as shown below:

Column 1,
Line 19, please change "Performance Disc Drives"." to -- Performance Disc Drives", pending. --.

Column 11,
Line 49, please change "positioned" to -- a one-piece core positioned --.

Column 13,
Line 3, please change "too" to -- top --.
Line 36, please change "care" to -- core --.

Signed and Sealed this

Twenty-eighth Day of September, 2004

JON W. DUDAS
*Director of the United States Patent and Trademark Office*